United States Patent
Florentin et al.

[11] Patent Number: 5,835,147
[45] Date of Patent: Nov. 10, 1998

[54] METHOD FOR COMPRESSION AND DECOMPRESSION OF A VIDEO SIGNAL

[75] Inventors: Itzhak Florentin, Mobile Post Misgav; Itzhak Messing, Haifa, both of Israel

[73] Assignee: State of Israel/Ministry of Defense Armament Development Authority-Rafael, Haifa, Israel

[21] Appl. No.: 749,493

[22] Filed: Nov. 15, 1996

[30] Foreign Application Priority Data

Nov. 19, 1995 [IL] Israel ........................................ 116060

[51] Int. Cl.$^6$ ................................ H04N 7/48; H04N 7/36
[52] U.S. Cl. ............................................ 348/416; 348/416
[58] Field of Search .................................. 348/409, 413, 348/416; H04N 7/36, 7/48

[56] References Cited

U.S. PATENT DOCUMENTS

| | | | |
|---|---|---|---|
| 4,989,087 | 1/1991 | Pele | 348/416 |
| 5,305,400 | 4/1994 | Butera | 382/56 |
| 5,646,691 | 7/1997 | Yokoyama | 348/416 |
| 5,706,055 | 1/1998 | Katto | 348/409 |

Primary Examiner—Howard Britton
Attorney, Agent, or Firm—Ladas & Parry

[57] ABSTRACT

A method for transmitting a sequence of images is provided. The method includes the steps of previously defining that the sequence of images includes a plurality of frame segments and that each of the segments includes two types of images, update frames and intermediate frames, encoding and transmitting the sequence of images and decoding the transmitted sequence of images. When an update frame is present, the step of encoding and transmitting includes the step of compressing and transmitting the update frame. When an intermediate frame is present, the step of encoding and transmitting includes the step of generating and transmitting intermediate global motion parameters describing motion between the update frame and the intermediate frame. When the compressed update frame is received, decoding the transmitted sequence of images includes the step of decompressing the compressed update frame to produce a transmitted update frame. When the intermediate motion parameters are received, decoding the transmitted sequence of images includes the step of warping the transmitted update frame with the intermediate motion parameters thereby to produce a transmitted intermediate frame.

8 Claims, 7 Drawing Sheets

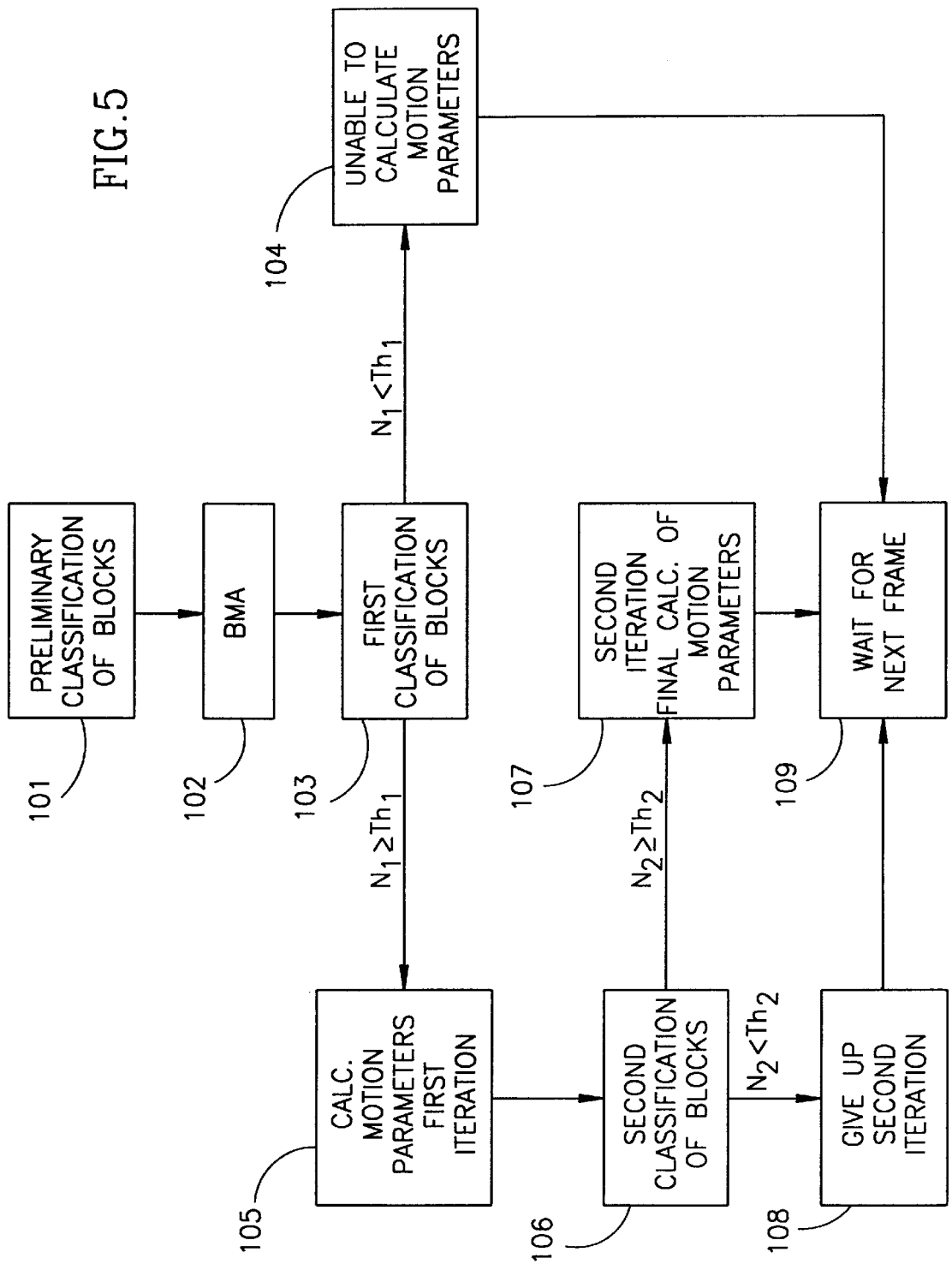

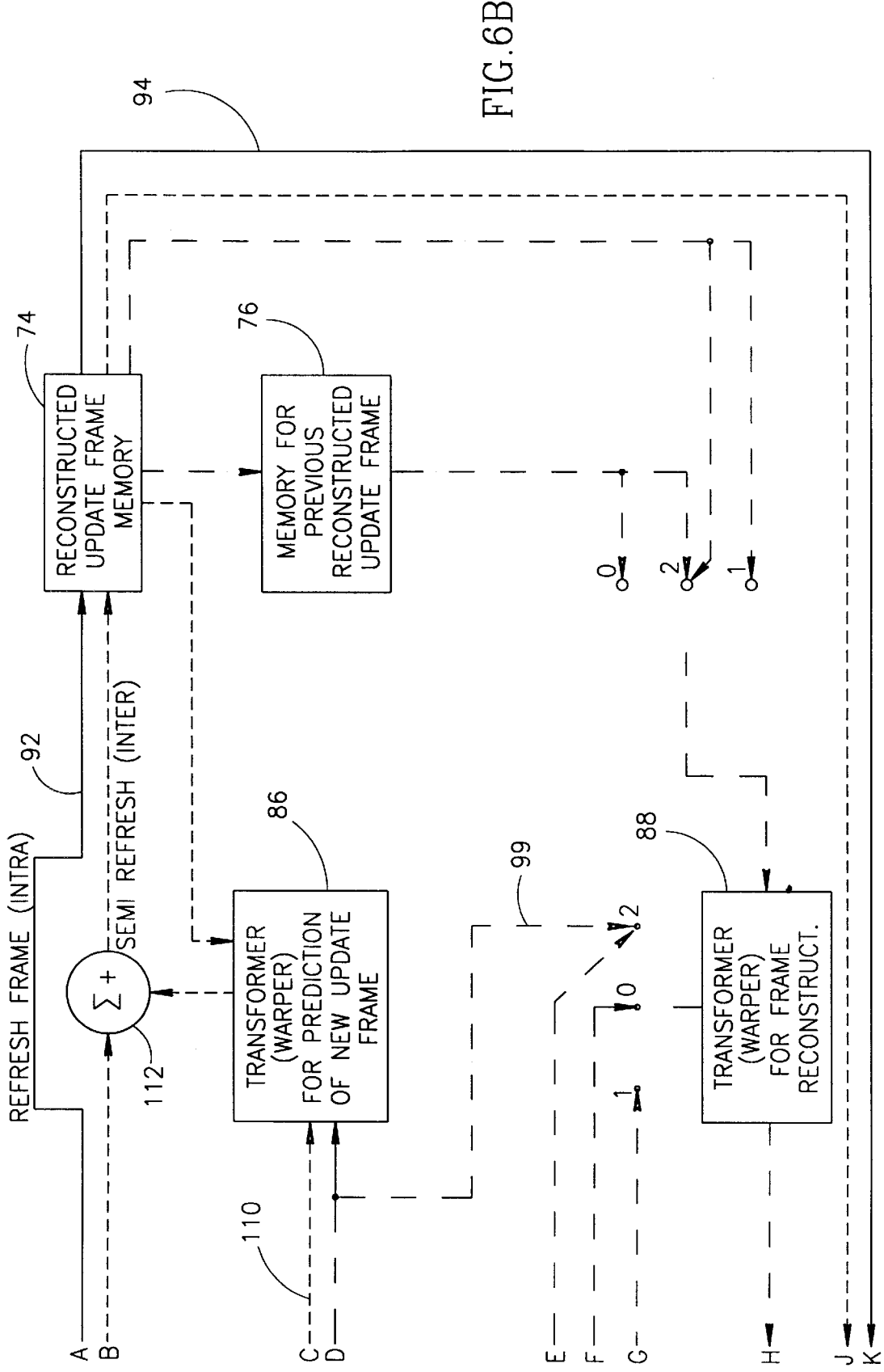

METHOD FOR COMPRESSION AND DECOMPRESSION OF A VIDEO SIGNAL

FIELD OF THE INVENTION

The present invention relates generally to methods for very low bit rate (VLBR) transmission of video data.

BACKGROUND OF THE INVENTION

Image compression techniques are known. One well-known standard is that promulgated by the Joint Photographic Experts Group (JPEG) which is known as JPEG compression. JPEG compression is utilized for still, or single, images. A similar standard, the Motion Pictures Experts group (MPEG), is applied for the transmission of moving pictures (e.g. video).

MPEG compression is typically utilized for transmitting a video signal across a channel, or for storage and retrieval of visual data. Rather than transmitting every frame of the video signal, the "MPEG1" standard defines how to encode the differences between successive (neighboring) frames. The receiving side decodes the differences and creates therefrom each new frame.

The above mentioned standards are based on the hybrid DCT (Discrete Cosine Transform) motion compensation (MC) method. Other popular compression methods utilize wavelet, sub-band, and fractal technology.

Unfortunately, "MPEG1" and other video compression techniques, such as ITU (International Telecommunications Union) recommendation H.261 or ISO (International Standards Organization)/IEC 13818 (known as "MPEG2") are not very efficient for transmission through narrow bandwidth channels in which quality is somewhat compromised in order to utilize the small bandwidth.

A new subgroup of the ISO/IEC, called MPEG4, has recently been established to produce a standard for very low bit rate (VLBR) encoding of video signals. Within this group, a suggestion was made to amend the H.261 recommendation in order to improve its performance for VLBR encoding.

It has been recognized that by taking the temporal redundancy of image sequences into account, it is possible to reduce the data during encoding. Motion estimators can be used to determine which parts of the pictures are moving or stationary and which parts of the stationary background are covered or made visible by the moving parts of the picture. Motion estimation requires complicated algorithms which need to be performed in real time and thus motion estimation was generally only considered at the transmission end. The motion information is transmitted as coded motion vectors and at the receiver end the complete picture is reconstructed from the motion information. With advances in circuit integration it is possible to use complex signal-processing techniques at the receiving end. A further reduction in the amount of video data which needs to transmitted can be made if the large amount of motion information to form the motion estimates need not be transmitted.

U.S. Pat. No. 5,305,400 to Butera describes a method of encoding and decoding the video data of an image sequence which does not transmit the independent motion information. Instead of encoding each single frame of the video sequence, each nth key frame is transmitted. From two adjacent key frame data fields, n−1 phantom data fields are calculated, using a linear interpolation method, taking into account n−1 motion fields. n−1 difference image data fields are determined at the transmitting end and transmitted together with the key frame data fields. At the receiving end, the original sequence of data fields is reconstructed, from the transmitted data fields by recalculating the motion fields, using a similar linear interpolation method.

The calculation of the intermediate frames using a linear interpolation method is only accurate where the changes between each of the intermediate frames between two key frames is equal. The greater the spacing between key frames, the lower the accuracy of estimation of the intermediate frames. A further disadvantage of Butera's method is that it incorporates a rather long delay in that both key frames on either side of the intermediate frames need to be received before decoding can begin. In addition, the decoder is very complex.

SUMMARY OF THE PRESENT INVENTION

It is therefore an object of the present invention to provide a very low bit rate video compression technique which is computationally simple and accurate and can be implemented in real-time.

Applicants have recognized that because the image being presented in a video sequence does not change rapidly, the video sequence can be divided into segments. Each segment, which can be any convenient size, consists of a first frame termed an "update" frame and intermediate frames. Only the first frame in a sequence (update frame) is encoded and transmitted.

Update frames are encoded according to standard encoding techniques, such as JPEG, wavelet, fractal or other image compression techniques, and transmitted to a receiver or a storage medium. The intermediate frames subsequent to an update frame, are described by the motion field of the current intermediate frame relative to the update frame. Only data describing the motion (motion parameters) of the current intermediate frame, are encoded and transmitted to the receiving system.

The motion data can be determined in accordance with any appropriate motion estimator. For example, the motion estimator may utilize a block matcher which produces a relatively sparse motion field between the source and the reference frame.

Preferably, a global motion estimator, which models the entire motion field by one or more geometric transformations, is utilized. The transformations using a global motion estimator are defined by relatively few parameters which are then transmitted to the receiving system.

The receiving system includes a decoder which decodes the encoded bit stream consisting of the compressed update frames and motion parameters. The decoder performs the inverse of whatever image compression technique was performed on the update frame at the encoder to obtain the reconstructed update frame. In order to reconstruct the intermediate frames, the decoder decodes the motion parameters and then warps the already reconstructed update frame by means of the decoded motion parameters. The warping may involve one or more of the update frames as described in more detail in the detailed description.

There is thus provided, in accordance with a preferred embodiment of the invention, a method for transmitting a sequence of images. The method includes the steps of previously defining that the sequence of images includes a plurality of frame segments and that each of the segments includes two types of images, update frames and intermediate frames, encoding and transmitting the sequence of images and decoding the transmitted sequence of images. When an update frame is present, the step of encoding and transmitting includes the step of compressing and transmitting the update frame. When an intermediate frame is present, the step of encoding and transmitting includes the step of generating and transmitting intermediate global motion parameters describing motion between the update frame and the intermediate frame. When the compressed update frame is received, decoding the transmitted sequence of images includes the step of decompressing the compressed update frame to produce a transmitted update frame. When the intermediate motion parameters are received, decoding the transmitted sequence of images includes the step of warping the transmitted update frame with the intermediate motion parameters thereby to produce a transmitted intermediate frame.

Furthermore, in accordance with a preferred embodiment of the invention, the step of encoding and transmitting includes the step of generating and transmitting intermediate motion parameters describing motion between the first of update frame and the intermediate frame;

Furthermore, in accordance with a preferred embodiment of the invention, the step of decoding the transmitted sequence of images, includes the step of warping the transmitted first update frame with the intermediate motion parameters thereby to produce a transmitted intermediate frame.

Furthermore, in accordance with a preferred embodiment of the invention, the step of compressing and transmitting the update frame further includes the steps of determining the motion of the update frame by warping the previously transmitted update frame with the motion parameters, predicting the update frame from the determined motion information and the update frame, calculating the difference between the predicted frame and the update frame and compressing and transmitting the calculated difference frame.

Furthermore, in accordance with a preferred embodiment of the invention, the step of decompressing the compressed update frame further includes the steps of warping the previously received update frame with the motion parameters, decompressing the calculated difference frame and summing the decompressed calculated difference frame with the warped update frame to obtain an estimated update frame.

BRIEF DESCRIPTION OF THE DRAWINGS

The present invention will be understood and appreciated more fully from the following detailed description taken in conjunction with the drawings in which:

FIG. 5 is a flow diagram of the operations of a portion of the motion estimator of FIG. 4;

FIGS. 6A and 6B together form a detailed partially flow chart, partially block diagram illustration of the decoder of FIG. 1.

DETAILED DESCRIPTION OF A PREFERRED EMBODIMENT

Figure 1:
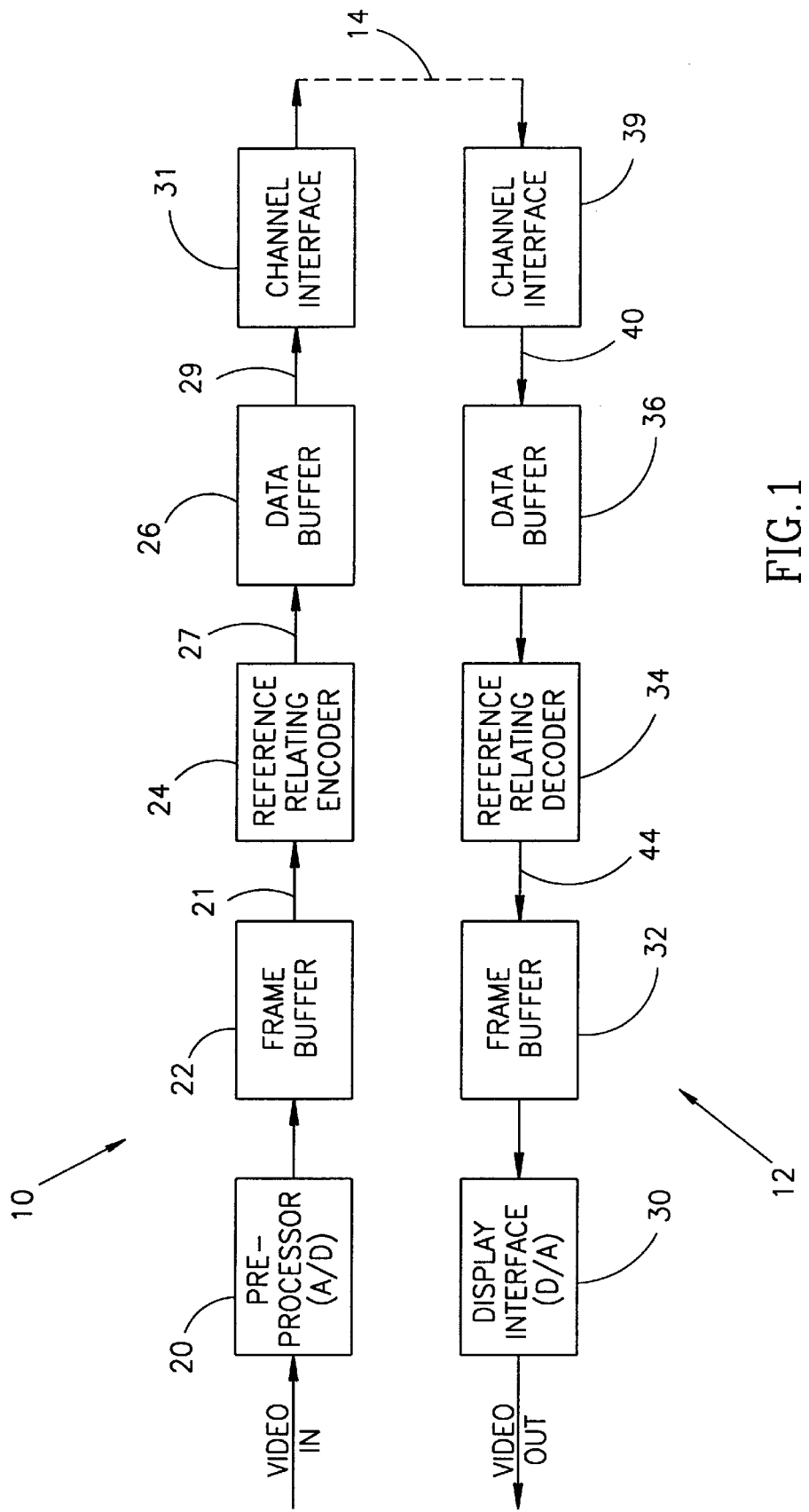
FIG. 1 is a block diagram illustration of a reference relating motion communication system, constructed and operative in accordance with a preferred embodiment of the present invention.
Figure 2:
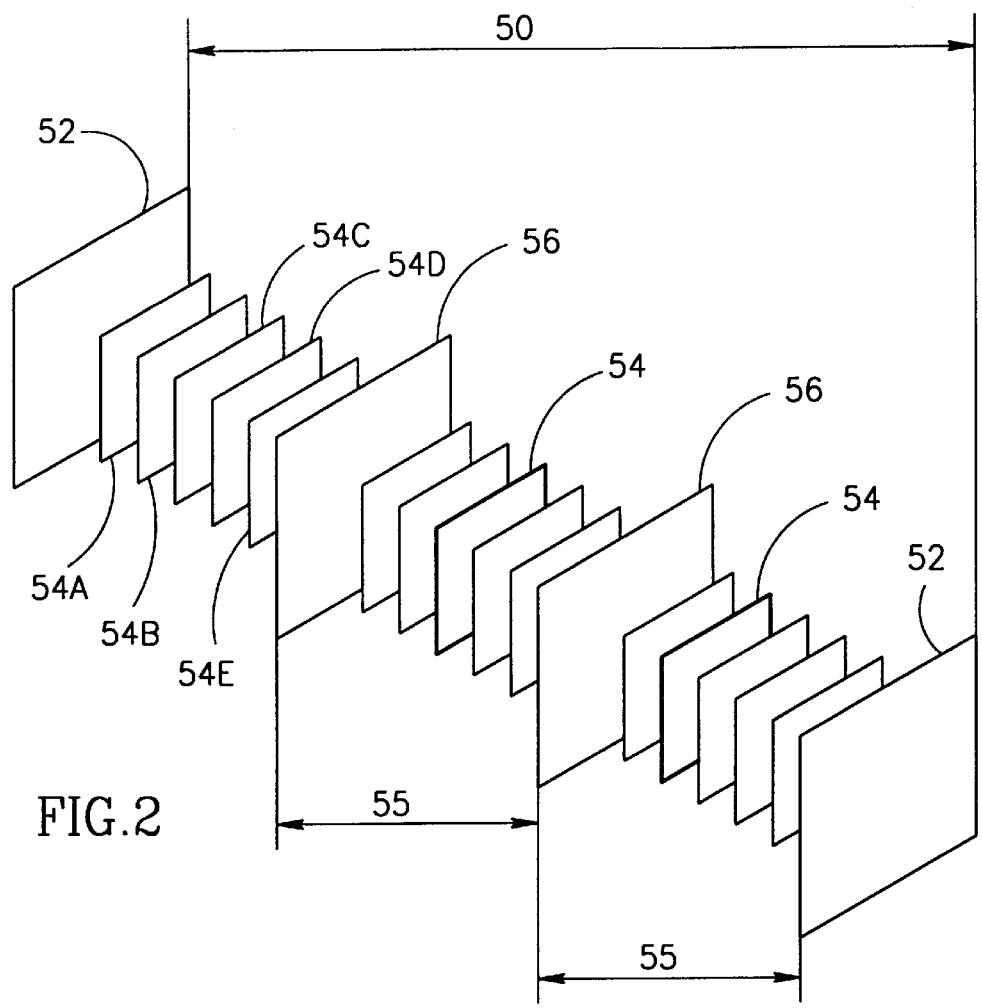
FIG. 2 is a schematic illustration of a frame sequence, divided in accordance with a preferred embodiment of the present invention.

Reference is now made to FIG. 1 which illustrates a reference relating motion communication system, constructed and operative in accordance with a preferred embodiment of the present invention. Reference is also made to FIG. 2 which illustrates a sequence of frames divided in accordance with the present invention.

The communication system of the present invention comprises a transmitter 10 and a receiver 12. The transmitter encodes an input video signal for transmission through a small bandwidth communication channel 14, such as radio links or cellular telephone channels. The receiver 12 decodes the transmitted, encoded video signal and provides the reconstructed video signal to a display (not shown).

The transmitter 10 comprises a digitizing pre-processor 20, a frame buffer 22, a reference relating encoder 24, a data buffer 26 and a transmitting channel interface 29. The digitizing pre-processor 20 processes an input video signal, such as one in the RS 170 standard format. The pre-processing can include, but is not limited to, conversion from an analog signal to a digital one, low pass filtering and horizontal and vertical decimation. Decimation typically involves reducing the number of pixels in each frame, typically by removing every n pixels per row (horizontal decimation) and/or per column (vertical decimation). The factor n can be of any number, for example, 2.

The frame buffer 22 converts the video signal from a sequential signal to a frame signal 21 formed of frames of images. Encoder 24 produces an encoded signal 27.

Reference relating encoder 24 separates the incoming video sequence into a plurality of frame segments 50. Each frame segment 50 comprises at least one section 55. The number of sections 55, within a frame segment 50, depends on the amount of motion occurring in the video sequence.

FIG. 2 schematically illustrates one of the plurality of frame segments 50 with three sections 55. Each frame segment 50 comprises at least two "refresh" frames 52 and a plurality of "intermediate" frames 54. The start and end of each frame segment 50 is a refresh frame 52. In the example of FIG. 2, each of the three sections 55 has five intermediate frames 54 designated 54a, 54b . . . 54e. The frame at the end of each section 55, which is not a segment end, is known as a "semi-refresh" frame 56. Semi-refresh frames 56 are update frames which are encoded by the "interframe" or "predicted" frame difference method. Semi-refresh frame 56 may be distinguished from refresh frames 52 since, generally, refresh frames 52 are compressed using the "intraframe" or "independently compressed" method. The methods of compression are described hereinbelow.

The semi-refresh frames 56 and refresh frames 52 are encoded by encoder 24. The entire frame (that is, either refresh frame 52 and semi-refresh frame 56) is compressed and transmitted.

In the case of the intermediate frames 54, only the motion parameters, vis-a-vis most recent update frame, that is either the refresh frame 52 or semi-refresh frame 56, are transmitted. Since motion parameters are typically comprised of a relatively few data items, the amount of data transmitted per intermediate frame is low.

The encoded signal 27 has a variable bit rate, where, when an entire frame is encoded, the number of bits to be transmitted is large while, when only motion parameters are produced, the number of bits to be transmitted is small. Therefore, transmitter 10 includes data buffer 26. Data buffer 26 buffers between the variable bit rate of the encoder 24 and the constant bit rate of the channel interface 31.

The transmitting channel interface 31 prepares the output of the coder 10, a bit stream, for transmission along channel 14.

The receiver 12 comprises a display interface 30, a frame buffer 32, a reference relating decoder 34, a data buffer 36 and a receiving channel interface 39.

The receiving channel interface 39 converts the communication signal received from the channel 14 into a bit stream and provides a signal 40 to data buffer 36. Data buffer 36 provides data to the encoder 34 at a variable rate determined by the decoding operation.

Reference relating decoder 34 decodes the data from data buffer 36 and produces a sequence 44 of frames. If the data in buffer 36 is of a compressed frame (refresh or semi-refresh), the frame is simply decompressed and stored. If the data in buffer 36 is encoded motion information, decoder 34 decodes the motion information and warps the most recent updated frame (refresh frame 52 or semi-refresh frame 56) with the motion information in order to reproduce the intermediate frame to which the motion information relates. The result is a sequence 44 of frames.

Sequence 44 is stored in frame buffer 32 until it is utilized for display on a display device (not shown). Display interface 30 converts the signal stored in frame buffer 32 to one appropriate for the display device.

It will be appreciated that the present invention transmits a video sequence with a minimum of data. For most of the frames of the sequence (that is, the intermediate frames), only motion information is transmitted. However, to ensure that information in the video signal does not get lost over time, periodically, the full frame (refresh frame 52 or semi-refresh frame 56) is compressed.

In order to reduce the number of bits for transmitting the updated frame, the motion information can be utilized to predict the next update frame from the previous update frame. Only the difference between the prediction and the actual frame is compressed and transmitted. In this way, the quality of the transmitted video sequence is maintained but the amount of information being transmitted is relatively small.

Update frames compressed by the latter mode of compression are known as "predicted" update frames, to differentiate from the "independent frame compression" update frames. Generally, refresh frames 52 are independently compressed and semi-refresh frames 56 are "predicted". It will be appreciated that the ratio between independently compressed (or intra) frames and predicted (or inter) frames can be adapted to suit the amount of motion in the video sequence being transmitted.

The reference relating encoder 24 has different modes of operation depending on the type of frame being received. For independently compressed refresh frames 52, encoder 24 simply compresses them, in accordance with any desired compression technique, such as JPEG, and then transmits them. In addition, encoder 24 decompresses the data to be transmitted and stores the resultant reconstructed frame.

For "predicted" update frames (semi-refresh frames 56), encoder 24 determines their motion from the previous reconstructed update frame (which may be a refresh 52 or semi-refresh frame 56) and then utilizes the reconstructed frame and the motion information to predict the new update frame (semi-refresh frame 56). The difference between the predicted frame and the actual update, known as a "frame of differences" D, is compressed, by the same compression technique as above, and transmitted. Once again, the encoder 24 decompresses the compressed data, and, produces a reconstructed update frame by summation with the predicted frame. The reconstructed frame is stored in memory.

For intermediate frames 54, the encoder 24 determines the motion parameters describing the motion from the last update frame (either refresh frame 52 or semi-refresh frame 56, to the present intermediate frame 54. The motion parameters are encoded and transmitted.

Figure 3:
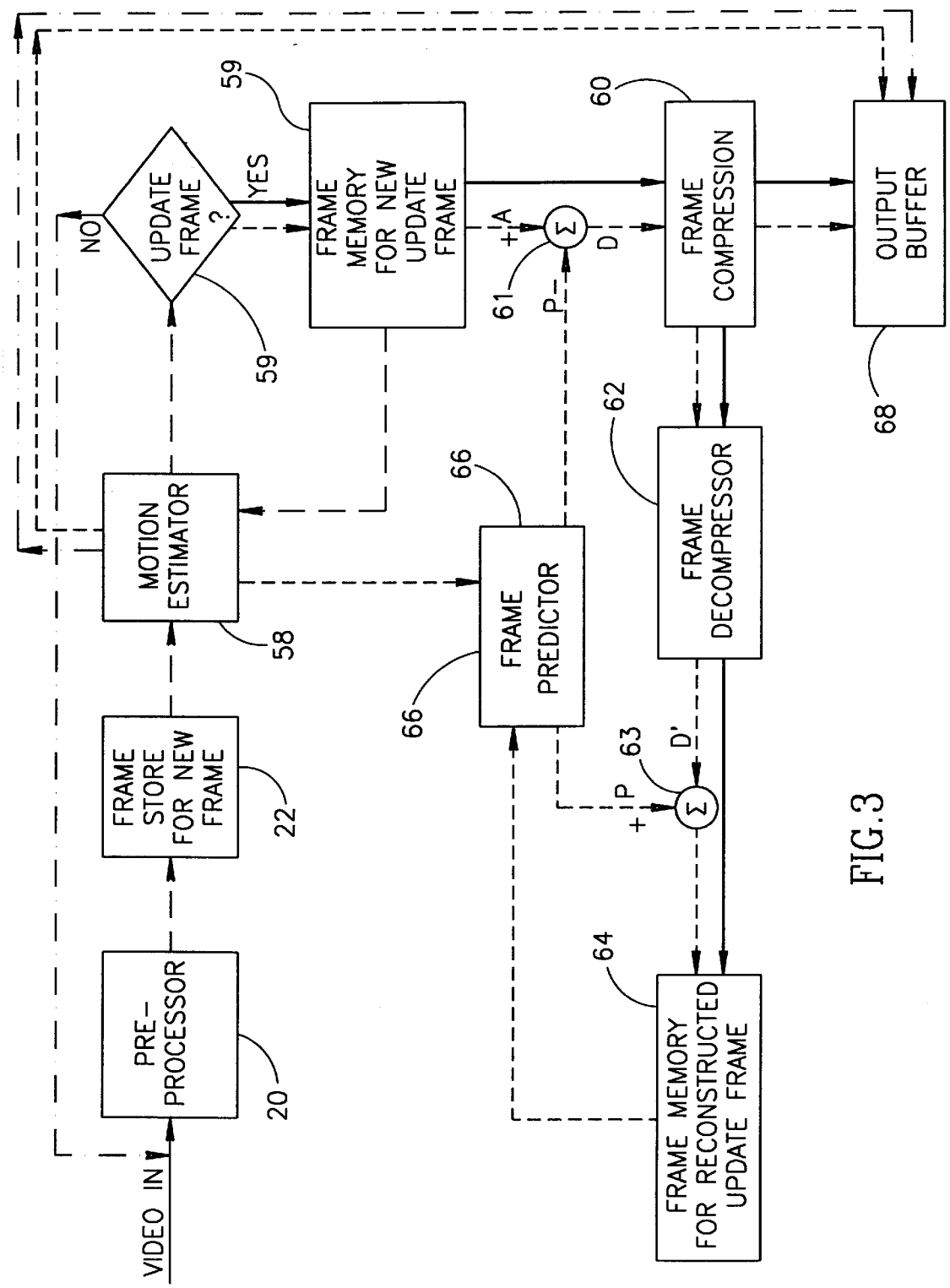
FIG. 3 is a detailed partially flow chart, partially block diagram illustration of the encoder of FIG. 1.

Reference is now made to FIG. 3 which illustrates the elements of reference relating encoder 24 and the method of encoding. The general pathway is marked with long dashed lines, the pathway for refresh frames 52 is marked with solid lines, the pathway for semi-refresh frames 56 is marked with short dashed lines and the pathway for intermediate frames 54 are marked with dashed and dotted lines.

Reference relating encoder 24 includes a motion estimator 58, a frame memory 59, a frame compressor 60, a frame decompressor 62, a reconstructed frame memory 64, a frame predictor 66 and an output buffer 68. Frame decompressor 62 performs the inverse compression operation from that performed by frame compressor 60, such as JPEG compression/decompression.

The video signal is captured and pre-processed by digitizing preprocessor 20, as described hereinabove. The pre-processed (or source) frame (that is, refresh frame 52, intermediate frame 54 or semi-refresh frame 56) is stored in memory buffer 22 and then sent to the motion estimator 58.

The type of source frame is determined, either externally, or, adaptively by motion estimator 58. If the source frame is an update frame (refresh frame 52 or semi-refresh frame 56), the source frame is stored in frame memory 59.

As indicated by the solid lines, the pathway for the refresh frames 52 is from the frame memory 59 to the frame compressor 60 and to the output buffer 68. The frame compressor compresses the refresh frames 52 and sends them to the output buffer 26.

In addition, the refresh frames 52 are decompressed, by decompressor 62 in order to store in reconstructed frame memory 64 a copy of the frame which the decoder 12 will create.

If the source frame is an intermediate frame 54, it is provided to the motion estimator 58 which determines the motion parameters with reference to the last update frame stored in memory 59, that is the most recent refresh or semi-refresh frame. The motion parameters are sent to output buffer 68. The intermediate frames 54 are not stored in frame memory 59.

If the source frame is a "predicted" update frame (semi-refresh frame 56), the source frame is stored in memory buffer 22 and then sent to motion estimator 58. Estimator 58 determines the motion parameters with reference to the last update frame stored in memory 59 and provides the motion parameters to frame predictor 66. Furthermore, the motion parameters are provided to the output buffer 68.

Frame predictor 66 utilizes the motion parameters to warp the frame which is currently stored in the reconstructed frame memory 64 and, via a subtractor 61, subtracts the resultant predicted frame P from the most recent, actual, update frame A stored in frame memory 59. The result is the difference frame D.

Frame compressor 60 compresses the difference frame D and provides it to output buffer 68. Frame decompressor 62 then decompresses the compressed difference frame D, producing frame D', and provides it to a summation unit 63. Summation unit 63 adds frame D' to the predicted frame P and stores the resultant reconstructed frame R in reconstructed frame memory 64.

Thus, the output buffer 68 provides three different types of output, the motion parameters of the intermediate frames 54 and the semi-refresh frames 56, and two types of compressed frames, (e.g. the refresh frames 52 and the difference frames D corresponding to the semi-refresh frames 54). If desired, the motion parameters between refresh frames can also be estimated and transmitted.

The motion data can be determined in accordance with any appropriate motion estimator. For example, the motion estimator may utilize a block matcher which produces a relatively sparse motion field between the source and the reference frame. Alternatively, the motion estimator can be a global motion estimator which models the entire motion field by reference to one or more geometric transformations. The transformations using a global motion estimator are defined by relatively few parameters which are then transmitted to the receiving system.

Figure 4:
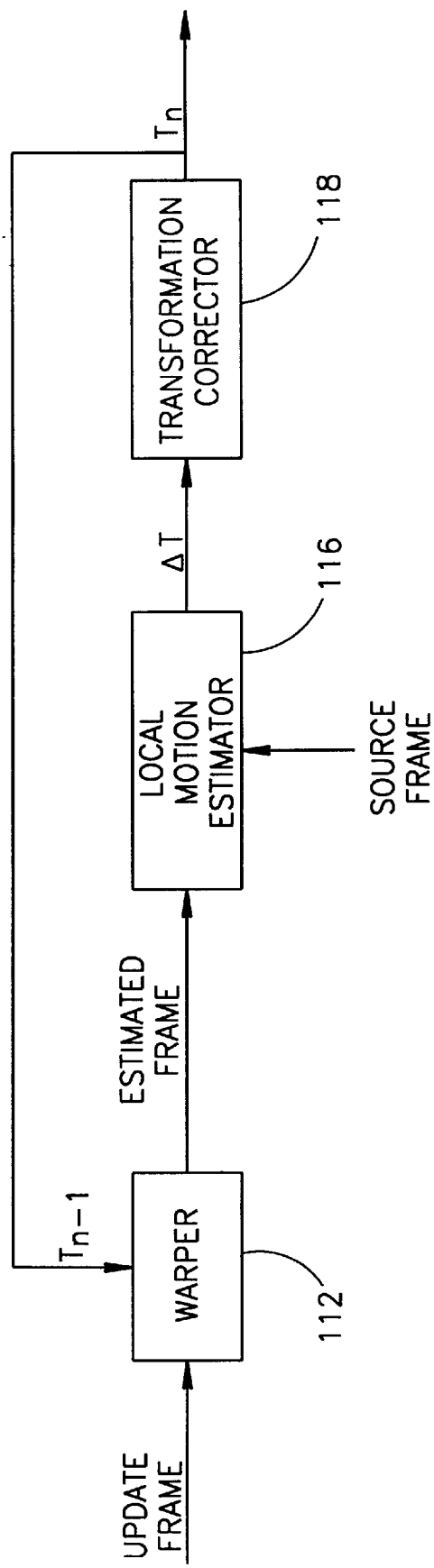
FIG. 4 is a block diagram illustration of motion estimation.

Reference is now made to FIG. 4 which details the elements of one embodiment of motion estimator 58. Estimator 58 includes a warper 112, a local motion estimator 116 and a transformation corrector 118.

Warper 112 receives the previous update frame (semi-refresh or refresh) from memory 59 and warps it in accordance with the transformation $T_{n-1}$ determined for the source frame (semi-refresh, refresh or intermediate) received at time n−1. This produces an estimated frame which should look approximately like the previous source frame.

Local motion estimator 116 receives the estimated frame and the source frame and determines the motion therebetween in accordance with any suitable motion estimation operation, such as block matching. One suitable motion estimation procedure is provided in FIG. 6.

The resultant estimated motion, denoted delta_T and represented by global motion parameters, is the correction to the previous transformation $T_{n-1}$. Therefore, transformation corrector 118 cascades the correction delta_T onto the previous transformation $T_{n-1}$ in order to produce the current transformation $T_n$. The current transformation $T_n$ is provided as output and is also provided to warper 112 for use in warping the next source frame n+1.

Reference is now briefly made to FIG. 5 which illustrates the operations of the local motion estimator 116 based on a block matching algorithm. In step 101, a preliminary classification is performed to sort out improper blocks, for example, blocks which are known to be unmatchable from the previous frame calculation. Another possibility is to perform a block activity calculation and to choose only the most active blocks.

In step 102, for each proper block, the block matching algorithm finds a corresponding block (of equal size) in the estimated frame. Typically the blocks are of size 8×8 or 16×16 pixels and are non-overlapping.

This block is a best match with respect to an established criterion such as correlation function, MSE (mean square error between pixels or corresponding blocks) or MAE (mean absolute error between pixels). The relative displacement and the MAE of best match are the output of step 102. The block displacement vectors are ascribed to the center pixels of the blocks.

In step 103, the motion vectors undergo a first classifying stage to sort out unreliable block displacement vectors. Several different reliability criteria can be employed. For example, the criterion of sharply peaked MAE function (the ratio between MAE of best match and average MAE of blocks corresponding to nearest displacement values is below an imposed threshold value) can be utilized. If the number of reliable vectors is below an imposed threshold level there are several options to follow, such as using previously calculated motion parameters or considering the previous source as a new update frame. Otherwise the local motion estimator proceeds to the calculation of the motion parameters, step 105, in which a least mean square fit of the "measured" displacement vectors to the calculated values, using the geometrical transformation function, is performed.

These motion parameters are used in a "reverse" mode in step 106 for a second classification or iteration. The local motion vectors are calculated from these parameters and compared to the measured ones (from step 102). The measured vectors whose distance from the calculated ones is smaller than a threshold value are chosen as input for a second iteration of motion parameters calculation (step 107), which is similar to the first iteration. This iteration is performed only if the number of chosen vectors exceeds a threshold value. The resulting parameters, delta_T, are the final output of the local motion estimation step (step 116, FIG. 4).

It will be appreciated that there are many methods, known in the art, for producing the motion parameters, any of which may be suitable for the present invention. For example, locating prominent features, such as corners, and tracking their motion by correlation matching is one suitable method.

Figure 7:
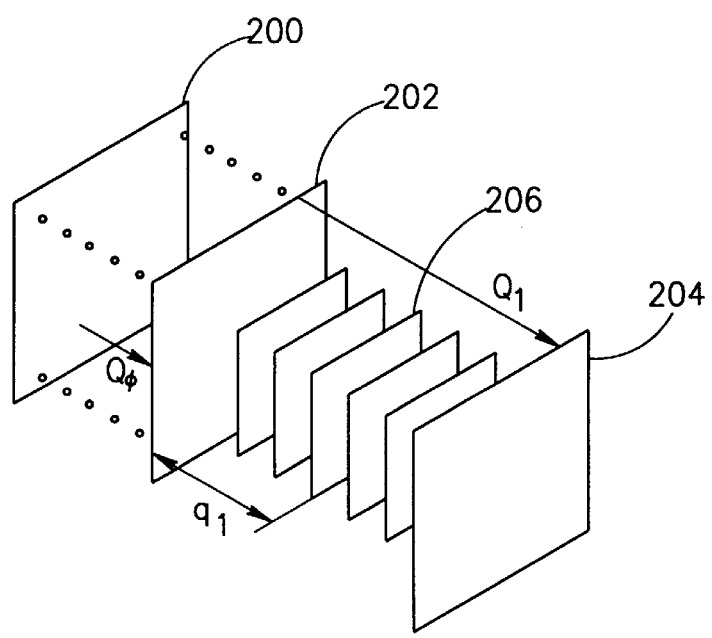
FIG. 7 is a block diagram illustration of the decoder of the present invention.
Figure 6A:
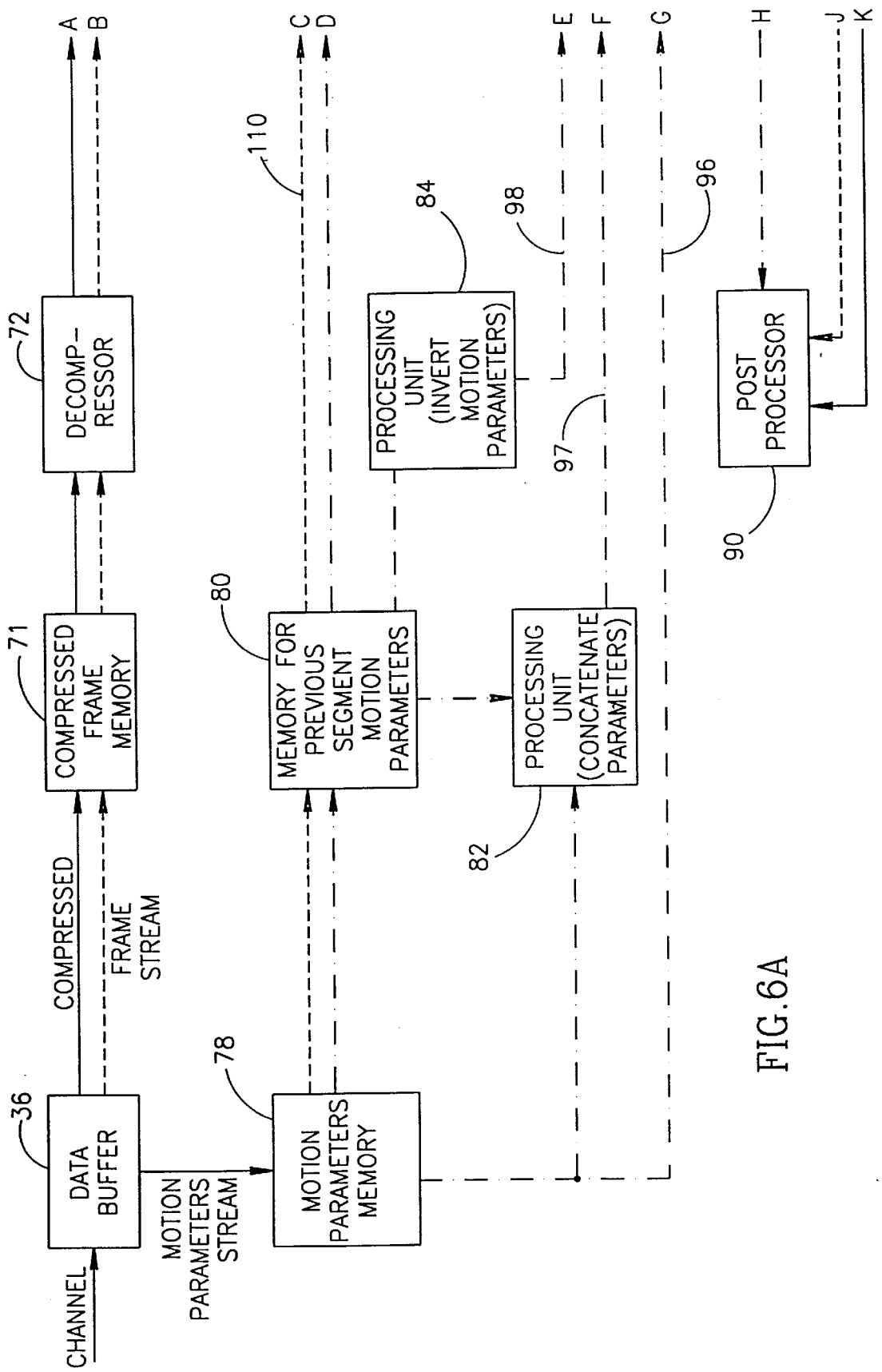

Reference is now made to FIGS. 6A and 6B which together illustrate the elements of decoder 34 and to FIG. 7 which is useful in understanding its operation. Decoder 34 has two main pathways, one for compressed frames and one for motion parameters, both of which receive data from the data buffer 36. The compressed frame pathway comprises a compressed frame memory 71, a decompressor 72, a reconstructed frame memory 74 and a previous reconstructed frame memory 76. The motion parameters pathway comprises a motion parameters memory 78, a previous motion parameters memory 80, two processing units 82 and 84, and two transformers 86 and 88. In addition, decoder 34 includes a post-processor 90.

Furthermore, as in FIG. 3, the pathway for refresh frames 52 is marked with solid lines, the pathway for semi-refresh frames 56 is marked with short dashed lines and the pathway for intermediate frames 54 are marked with dashed and dotted lines.

The compressed frames are first stored in the compressed frame memory 71 and then are decompressed by decompressor 72. If the compressed frame was a refresh frame, it is then stored in reconstructed frame memory 74, as indicated by line 92. At the appropriate moment, the frame stored in memory 74 is provided, along line 94, to the post-processor 90 for processing for display or other use.

Before updating memory 74, the frame currently stored is moved into previous frame memory 76. Thus, with reference to FIG. 7, two update frames of the three labeled 200, 202 and 204 are stored. FIG. 7 also illustrates a plurality of intermediate frames, one of which is labeled 206.

The motion parameters are initially stored in memory 78. They can be processed in one of four ways, as indicated by lines 96, 97, 98 and 99, which, as noted by numbers 0, 1 and 2, provide three different levels of delay, where 0 is the lowest (that is, the shortest) delay and 2 is the longest delay. All of lines 96–99 provide the motion parameters to transformer 88 which transforms a reconstructed frame, from either of memories 74 or 76, in accordance with the received motion parameters. The input of reconstructed update frames into the transformer 88 are also labeled 0, 1 and 2 and are selected in accordance with the selected line 96–99.

When the motion parameters are utilized as is (line 96), transformer 88 operates on the update frame stored in the current frame memory 74 which corresponds to update frame 202 of FIG. 7. Update frame 202 is transformed by motion parameters $q_1$ to create intermediate frame 206.

If it is desired to produce intermediate frame 206 with very little delay, it can be produced by transforming update frame 200, without utilizing the information of update frame 202. To do so, the previous motion parameters, labeled $Q_0$, from update frame 200 to update frame 202 are concatenated, by processing unit 82, with the current motion parameters $q_1$, relative to the update frame 202, and the resultant concatenated motion parameters are provided on line 97. Concurrently, the previous update frame 200 is provided from memory 76. Transformer 88 transforms update frame 200 with the concatenated motion parameters.

If more accurate representation of the intermediate frame 206 is desired, it can be produced by using information from the update frame 202 prior to intermediate frame 206 and the update frame 204 after intermediate frame 206. For this, the motion parameters must be stored until update frames 204 is received and processed and therefore, this mode of operation has the longest time delay. The motion parameters $q_1$ from update frame 202 are provided along line 99. The motion parameters $Q_1$ (from update frame 202 to update frame 204) are inverted by processing unit 84 and provided along line 98.

Transformer 88 utilizes parameters $q_1$ to warp update frame 202, from memory 76, thereby to produce a forward predicted frame of intermediate frame 206. Transformer 88 inverts parameters $Q_1$ and concatenates the result with parameters $q_1$. Transformer 88 then warps the update frame 204, from memory 74, with the concatenated parameters thereby to produce a "backward" predicted frame of intermediate frame 206. Finally, transformer 88 combines the forward and backward predicted frames to produce the output predicted frame of intermediate frame 206.

For semi-refresh frames 56, for whom the difference frame is compressed and the motion parameters provided, data is passed along both pathways. The motion parameters relative to previous update frame, as indicated by the dashed line 110, are provided to transformer 86 which transforms the current reconstructed frame of memory 74 with the motion parameters. The resultant predicted frame is added to the decompressed difference frame in summation unit 112. The current reconstructed frame is moved from memory 74 to memory 76 and the resultant reconstructed frame is stored in memory 74.

It will be appreciated by persons skilled in the art that the frames may be reconstructed by a variation of the delay modes described hereinabove to suit the trade-off in quality and speed required.

It will be appreciated by persons skilled in the art that the present invention is not limited to what has been particularly shown and described hereinabove. Rather the scope of the present invention is defined by the claims which follow:

We claim:

1. A method for transmitting a sequence of images, the method comprising the steps of:

a. having previously defined that said sequence of images comprises a plurality of frame segments and that each of said segments comprises two types of images, update frames and intermediate frames;

b. encoding and transmitting said sequence of images, the step of encoding and transmitting comprising the steps of:

i. when a update frame is present, compressing and transmitting said update frame;

ii. when an intermediate frame is present, generating and transmitting intermediate global motion parameters describing motion between said update frame and said intermediate frame;

c. decoding said transmitted sequence of images, comprising the steps of:

i. when said compressed update frame is received, decompressing said compressed update frame to produce a transmitted update frame;

ii. when said intermediate motion parameters are received, warping said transmitted update frame with said intermediate motion parameters thereby to produce a transmitted intermediate frame.

2. A method according to claim 1 and wherein said step of compressing and transmitting said update frame further comprises the steps of:

a. determining the motion of said update frame by warping the previously transmitted update frame with said motion parameters;

b. predicting said update frame from said determined motion information and said update frame c. calculating the difference between said predicted frame and said update frame; and d. compressing and transmitting said calculated difference frame.

3. A method according to claim 1 and wherein said step of decompressing said compressed update frame further comprises the steps of:

a. warping said previously received update frame with said motion parameters;

b. decompressing said calculated difference frame; and c. summing said decompressed calculated difference frame with said warped update frame to obtain an estimated update frame.

4. A method for transmitting a sequence of images, the method comprising the steps of:

a. having previously defined that said sequence of images comprises a plurality of frame segments and that each of said segments comprises at least one update frame and a plurality of intermediate frames;

b. encoding and transmitting said sequence of images, the step of encoding and transmitting comprising the step of generating and transmitting intermediate motion parameters describing motion between the first of said at least one update frame and said intermediate frame; and c. decoding said transmitted sequence of images, comprising the step of warping said transmitted first update frame with said intermediate motion parameters thereby to produce a transmitted intermediate frame.

5. A method according to claim 4 and wherein said step of compressing and transmitting said update frame further comprises the steps of:

a. determining the motion of said update frame by warping the previously transmitted update frame with said motion parameters;

b. predicting said update frame from said determined motion information and said update frame c. calculating the difference between said predicted frame and said update frame; and d. compressing and transmitting said calculated difference frame.

6. A method according to claim 4 and wherein said step of decompressing said compressed update frame further comprises the steps of:

a. warping said previously received update frame with said motion parameters;

b. decompressing said calculated difference frame; and c. summing said decompressed calculated difference frame with said warped update frame to obtain an estimated update frame.

7. A method for decoding a transmitted sequence of encoded images, the method comprising the steps of:

a. having previously defined that said encoded sequence of images comprises a plurality of frame segments and that each of said segments comprises two types of images, update frames and intermediate frames;

b. previously selecting from among a low, medium and high delay levels for intermediate frames;

c. receiving motion parameters between update frames and from update frames to intermediate frames and receiving independently compressed update frames;

d. for a low delay level, reconstructing an intermediate frame by concatenating the motion parameters between the previous update frame and the most recent update frame with the motion parameters from the most recent update frame to the intermediate frame and warping the previous update frame with the concatenated motion parameters;

e. for a medium delay level, reconstructing an intermediate frame by warping the most recent update frame with the motion parameters from the most recent update frame to the intermediate frame;

f. for a high delay level, predicting an intermediate frame by i. creating a backward predicted intermediate frame by inverting the motion parameters from the most recent update frame to the next update frame, which came after the intermediate frame of interest, concatenating the inverted motion parameters with the motion parameters from the most recent update frame to the intermediate frame, and warping the next update frame with the concatenated motion parameters;

ii. creating a forward predicted intermediate frame by warping the most recent update frame with the motion parameters from the most recent update frame to the intermediate frame; and iii. combining the backward and forward predicted intermediate frames into a reconstructed frame g. decompressing the compressed update frames.

8. A method according to claim 7 and wherein said encoded transmitted sequence of images also includes compressed difference frames and said step of decompressing includes the step of reconstructing said update frames from said compressed difference frames and from motion parameters between first update frames and second update frames.

* * * * *